US012630662B2

(12) United States Patent
Merkel et al.

(10) Patent No.: US 12,630,662 B2
(45) Date of Patent: May 19, 2026

(54) DISTILLATION OF POLYISOCYANATES

(71) Applicant: COVESTRO INTELLECTUAL PROPERTY GMBH & CO. KG, Leverkusen (DE)

(72) Inventors: Michael Merkel, Düsseldorf (DE); Anna Grosse Daldrup, Mettmann (DE); Christoph Eggert, Cologne (DE); Stefan Groth, Leverkusen (DE); Markus Meuresch, Cologne (DE); Monika Groetzner, Bergisch Gladbach (DE); Stefan Nolte, Wuppertal (DE)

(73) Assignee: Covestro Deutschland AG, Leverkusen (DE)

( * ) Notice: Subject to any disclaimer, the term of this patent is extended or adjusted under 35 U.S.C. 154(b) by 1043 days.

(21) Appl. No.: 17/625,271

(22) PCT Filed: Jul. 6, 2020

(86) PCT No.: PCT/EP2020/068929
§ 371 (c)(1),
(2) Date: Jan. 6, 2022

(87) PCT Pub. No.: WO2021/008908
PCT Pub. Date: Jan. 21, 2021

(65) Prior Publication Data
US 2022/0267500 A1      Aug. 25, 2022

(30) Foreign Application Priority Data

Jul. 12, 2019      (EP) ..................................... 19185927

(51) Int. Cl.
| | |
|---|---|
| *C08G 18/02* | (2006.01) |
| *B01D 1/22* | (2006.01) |
| *B01D 3/14* | (2006.01) |
| *B01D 5/00* | (2006.01) |

(52) U.S. Cl.
CPC ............. *C08G 18/022* (2013.01); *B01D 1/22* (2013.01); *B01D 3/143* (2013.01); *B01D 5/006* (2013.01)

(58) Field of Classification Search
CPC ........ B01D 1/22; B01D 3/143; B01D 5/0042; B01D 5/006; C07C 2601/14; C07C 2602/42; C07C 263/20; C07C 265/04; C07C 265/08; C07C 265/10; C08G 18/022; C08G 18/10; C08G 18/48; C08G 18/73; C08G 18/7621; C08G 18/7837; C08G 18/7887; C09D 175/04
See application file for complete search history.

(56) References Cited

U.S. PATENT DOCUMENTS

| | | | | |
|---|---|---|---|---|
| 3,769,318 | A * | 10/1973 | Windemuth et al. ........................ | C08G 18/8003 560/24 |
| 8,445,622 | B2 | 5/2013 | Binder et al. | |
| 2003/0073800 | A1 | 4/2003 | Heinrich et al. | |
| 2004/0110915 | A1 | 6/2004 | Richter et al. | |
| 2005/0020798 | A1* | 1/2005 | Bartz ..................... | C08G 18/10 528/76 |
| 2009/0226549 | A1* | 9/2009 | Hughes .................. | A61K 36/61 424/734 |
| 2010/0292396 | A1 | 11/2010 | Binder et al. | |
| 2014/0288201 | A1* | 9/2014 | De Schrijver ..... | C08G 18/7621 521/107 |
| 2016/0208080 | A1 | 7/2016 | Laemmerhold et al. | |

FOREIGN PATENT DOCUMENTS

| | | |
|---|---|---|
| DE | 102004038784 A1 | 2/2006 |
| DE | 102008012971 A1 | 5/2009 |
| JP | 2004182991 A | 7/2004 |
| JP | 2010511662 A | 4/2010 |
| JP | 201363916 A | 4/2013 |
| JP | 2018513903 A | 5/2018 |
| WO | 2016170059 A1 | 10/2016 |

OTHER PUBLICATIONS

Paul Cardon (Sealless Eccentric Pumps for Isocyanates, pp. 1-5, Published 2012) (Year: 2012).*
Cold Traps (Vac Aero International, pp. 1-4, Published 2017) (Year: 2017).*
Anonymous, "Individuelle Kurzwegverdampferanlagen fur Laborbetrieb" (EN title : Short-path evaporator systems for Laboratory Operation) Aug. 1, 2020 Retrieved from Internet URL:https://www.vta-process.de/produkte/laboranlagen/kurzwegverdampferanlagen.html.

(Continued)

*Primary Examiner* — Amy C Bonaparte
*Assistant Examiner* — Blaine G Doletski
(74) *Attorney, Agent, or Firm* — The Webb Law Firm

(57) ABSTRACT
The invention relates to a method for producing polyisocyanates having a low monomer content, said method comprising the following steps: (i) modifying at least one monomeric diisocyanate to obtain a mixture containing at least one polyisocyanate and unconverted monomeric diisocyanate, (ii) separating the mixture obtained in step (i) into at least one gaseous stream containing monomeric diisocyanate and a liquid stream depleted of monomeric diisocyanate, (iii) partially condensing the gaseous stream from (ii) in at least one condenser, so that a liquid condensate and an uncondensed vapour stream are obtained, (iv) post-condensing the uncondensed vapour stream obtained in step (iii) in at least one post-condenser, so that a post-condensate and an uncondensed waste gas are obtained, and (v) delivering the uncondensed waste gas from step (iv) to the suction side of a vacuum pump, characterised in that the at least one post-condenser in step (iv) is operated at a post-condenser temperature, and the at least one condenser in step (iii) is operated at a condenser temperature, wherein the post-condenser temperature is lower by $\geq 1$ to $\leq 168$ K than the condenser temperature.

9 Claims, No Drawings

(56)     References Cited

OTHER PUBLICATIONS

International Search Report for PCT/EP2020/068929 issued on Sep. 14, 2020 by Authorized officer: Lanz, Sandra, Considered to the extent of the English translation of the written opinion PCT/EP2020/068929 6 pages made of record Jan. 6, 2022.

* cited by examiner

DISTILLATION OF POLYISOCYANATES

CROSS REFERENCE TO RELATED APPLICATIONS

This application is a national stage application under 35 U.S.C. § 371 of PCT/EP2020/068929, filed Jul. 6, 2020, which claims benefit of European Application No. 19185927.1, filed Jul. 12, 2019, both of which are incorporated herein by reference in their entireties.

FIELD OF THE INVENTION

The present invention relates to a process for producing low-monomer polyisocyanates and also to the polyisocyanates thereby obtainable, to the use thereof as starting materials for the production of polymers, and to the composite bodies containing the polymer.

BACKGROUND OF THE INVENTION

Modification reactions of aliphatic and cycloaliphatic diisocyanates have long been known. The polyisocyanates thereby obtained are used as crosslinker components in coating systems and adhesives. Customary modification reactions are on the one hand ones in which the isocyanates react with themselves, resulting for example in the formation of biurets, isocyanurates, uretdiones or iminooxadiazinediones. Alternatively, the isocyanates can be reacted and thus oligomerized with polyols or polyamines, with the formation of urethane, allophanate and/or urea groups. Of critical importance is the formation of higher-molecular-weight adducts that have a lower vapor pressure than the monomeric diisocyanates themselves. Unreacted diisocyanate is removed from the reaction mixture, for example by thin-film distillation, leaving behind the polyisocyanate as the bottom product, which can be diluted with solvent if desired.

The catalytic production of polyisocyanates and removal of unreacted diisocyanate from a polyisocyanate mixture by distillation is described in detail for example in WO2008/068198A1. The monomeric diisocyanate is preferably removed in a multistage distillation under reduced pressure at temperatures between 90 and 220° C. The pressure is preferably lower from one stage to the next, reaching 0.1 to 10 hPa in the final stage. The apparatus used are flash evaporators, falling-film evaporators, thin-film evaporators and/or short-path evaporators, the latter in turn being the preferred option in the final distillation stage, since their design is associated with low pressure loss and therefore permits operation at particularly low pressure. This allows the monomeric diisocyanate to be removed under mild conditions. It is expressly noted that thermal stress should be kept as low as possible, for example by dispensing with interim tanks and storage tanks or by keeping bottom volumes small and pipelines short. The distillate, that is to say the monomeric diisocyanate, is preferably recycled to the reaction and can if necessary be subjected to an additional treatment to improve the color index, for example a filtration. The condensation of the distillate and associated problems are not discussed.

DE102004038784A1 also describes the removal of unreacted diisocyanate from a polyisocyanate mixture by distillation. The distillation is carried out using at least one short-path evaporator, optionally in combination with other evaporators. The process conditions are defined as a range from 5 mbar to $10^{-4}$ mbar and an evaporator temperature of 30 to 230° C. The internal condenser temperature is also discussed in this document and is within a range from 5 to 150° C. In one embodiment, monomeric methylene diisocyanate is removed by distillation at 0.05 mbar and an evaporator temperature of 177° C. and the evaporated monomeric methylene diisocyanate is condensed at 50° C.

EP1426393A2 describes the production of low-monomer uretdione-containing polyisocyanates. The working examples describe the removal of hexamethylene diisocyanate from the polyisocyanate mixture by distillation. This is carried out using a short-path evaporator with pre-evaporator at a pressure of 0.1 to 0.5 mbar and a heating medium temperature of 140 to 150° C. Unreacted monomer and the catalyst are thereby removed, the distillate being reused in the reaction. The condensation of the distillate that is necessary here is not discussed.

EP1241197A1 describes the production of low-monomer isocyanate prepolymers. The crude product is distilled preferably in a short-path evaporator at a pressure within a range from 0.1 to 100 Pa and a condenser temperature of 25 to 75° C.

EP1451239B1 describes a process for the production of MDI-based prepolymers. Monomeric diisocyanate is removed by distillation in a series of evaporators, the evaporator temperature being within a range from 50 to 210° C. and the condenser temperature within a range from 15 to 55° C.

Besides the yield and quality of the product, the value of an industrial manufacturing process also encompasses the reliability of the process that permits stable operation without downtimes in industrial production and thus operation of the production systems with the minimum possible maintenance. When removing monomeric diisocyanate from polyisocyanates by distillation under reduced pressure, it is advantageous to keep thermal stress as low as possible. A low pressure in the distillation system is necessary, especially for the production of polyisocyanates having a particularly low monomer content. To achieve this, it is necessary for the condensation of the distillate to take place at very low temperatures so that the vacuum is not limited by the vapor pressure of low-boiling components. As described in the prior art cited above, the distillation usually takes place in a combination of evaporation apparatuses, each of which being equipped with condensers. In industrial practice, the desired low operating temperature of the condensers was however found to be associated regularly with production problems that as a result led to maintenance downtimes and thus production losses. This was caused by solid deposits forming on the condenser as a result of the low condenser temperature. As a result, the pressure loss to the vacuum system increased and the requisite negative pressure could not be permanently maintained, necessitating a stoppage to clean the condensers in order that production of the product in the desired low-monomer quality could continue. Attempts to correct the problems by varying the condenser temperature were unsuccessful. Higher condenser temperatures led to a loss of quality from the outset, since it was no longer possible to achieve the required negative pressure for the distillation. There was also increased damage to the vacuum pumps used for the distillation.

DETAILED DESCRIPTION OF THE INVENTION

The object of the invention was thus to provide a process for producing low-monomer polyisocyanates through which said polyisocyanates can be produced reliably and in excellent quality.

This object was achieved by a process for producing low-monomer polyisocyanates, comprising the following steps:

(i) modifying at least one monomeric diisocyanate to obtain a mixture comprising at least one polyisocyanate and unreacted monomeric diisocyanate, (ii) separating the mixture obtained in step (i) into at least one gaseous stream containing monomeric diisocyanate and a liquid stream depleted in monomeric diisocyanate, (iii) partially condensing the gaseous stream from (ii) in at least one condenser, affording a liquid condensate and an uncondensed vapor stream, (iv) performing a secondary condensation of the uncondensed vapor stream obtained in step (iii) in at least one secondary condenser, affording a secondary condensate and an uncondensed offgas, and (v) feeding the uncondensed offgas from step (iv) to the suction side of a vacuum pump, characterized in that the at least one secondary condenser in step (iv) is operated at a secondary condenser temperature and the at least one condenser in step (iii) is operated at a condenser temperature wherein the secondary condenser temperature is ≥1 to ≤168 K lower than the condenser temperature.

Expressions such as "a first evaporator and a second evaporator" or "first part (stream) and a second part (stream)" or "a first condenser and a second condenser" are, unless expressly stated otherwise, always to be interpreted as open formulations that do not exclude the presence of further (third, fourth, etc.) evaporators, part (streams) or condensers.

According to the invention, the terms "comprising" or "containing" preferably mean "consisting essentially of" and more preferably mean "consisting of".

In the present case, "polyisocyanate" denotes an isocyanate produced from a diisocyanate by modification, wherein at least two diisocyanate molecules have been incorporated into the polyisocyanate. Such polyisocyanates are often referred to as paint polyisocyanates. "Polyisocyanate" therefore expressly does not denote an isocyanate such as those obtained directly from the phosgenation reaction of a di- or polyamine.

In the present case, "condenser temperature", "secondary condenser temperature" or "cold trap temperature" are to be understood as meaning the flow temperature of the associated cooling medium, unless otherwise stated in the description.

"At least one diisocyanate" as used herein refers to 1 or more, for example 2, 3, 4, 5, 6, 7, 8, 9 or more, diisocyanates. In association with constituents of the compounds described herein, this FIGURE relates not to the absolute number of molecules, but to the nature of the constituent. "At least one diisocyanate" therefore means for example that only one type of diisocyanate or a plurality of different types of diisocyanates may be present without specifying the amount of the individual compounds.

Step (i)

The modification of the diisocyanate in step (i) takes place according to processes known per se and is also referred to as modification or oligomerization. The isocyanate reacts under suitable reaction conditions either with itself or with other compounds such as polyols, polythiols or polyamines. The reaction preferably takes place in the presence of a catalyst and is stopped by deactivating this catalyst when a certain degree of conversion is reached. Deactivation can be accomplished in different ways. It is preferably done by adding a compound that deactivates the catalyst. Some catalysts can also be thermally deactivated or removed from the reaction mixture in order to stop the reaction.

All industrially available aliphatic, cycloaliphatic, araliphatic or aromatic diisocyanates are initially suitable as monomeric diisocyanates for the modification.

Suitable aliphatic, cycloaliphatic, araliphatic or aromatic diisocyanates are for example selected from the group consisting of 1,4-diisocyanatobutane, 1,5-diisocyanatopentane (PDI) 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 2,4- and 2,6-diisocyanato-1-methylcyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 2,4'-diisocyanatodicyclohexylmethane, 1-isocyanato-1-methyl-4(3)-isocyanatomethylcyclohexane, bis(isocyanatomethyl)norbornane, 1,3- and 1,4-bis(isocyanatomethyl)benzene (XDI), 1,3- and 1,4-bis(2-isocyanatoprop-2-yl)benzene (TMXDI), tolylene 2,4- and 2,6-diisocyanate (TDI), 2,4'- and 4,4'-diisocyanatodiphenylmethane (MDI), 1,5-diisocyanatonaphthalene, phenylene 1,3- and 1,4-diisocyanate or any desired mixtures of such diisocyanates.

Particular preference is given to monomeric diisocyanates selected from the group consisting of 1,5-diisocyanatopentane (PDI), 1,6-diisocyanatohexane (HDI), 1-isocyanato-3,3,5-trimethyl-5-isocyanatomethylcyclohexane (isophorone diisocyanate, IPDI), 4,4'-diisocyanatodicyclohexylmethane, 2,4'-diisocyanatodicyclohexylmethane, bis(isocyanatomethyl)norbornane, 1,3- and 1,4-bis(isocyanatomethyl)benzene (XDI), tolylene diisocyanate (TDI), 2,4'- and 4,4'-diisocyanatodiphenylmethane (MDI) or any desired mixtures of such diisocyanates.

Very particular preference is given to monomeric diisocyanates selected from the group consisting of 1,5-diisocyanatopentane (PDI), 1,6-diisocyanatohexane (HDI), and 1-isocyanato-3,3,5-trimethyl-5-isocyanatomethylcyclohexane (isophorone diisocyanate, IPDI) or mixtures of these isocyanates with one another or with TDI.

Most preferred are monomeric diisocyanates selected from the group consisting of PDI and HDI.

Examples of polyisocyanates arising from the modification of these isocyanates are biuret polyisocyanates, isocyanurate polyisocyanates, uretdione polyisocyanates, urethane polyisocyanates, allophanate polyisocyanates, oxadiazinetrione polyisocyanates, iminooxadiazinedione polyisocyanates, carbodiimide polyisocyanates and/or urea polyisocyanates. Mixed forms are also possible, that is to say those containing for example allophanate groups and isocyanurate groups or allophanate groups and urethane groups. These may be assigned to one group or to the other. They are preferably assigned to the group that is represented with greater frequency in the polyisocyanate.

In a further advantageous embodiment of the process of the invention, the modification in step (i) is an intermolecular reaction between isocyanate groups, preferably in the presence of a catalyst, especially in the presence of a basic catalyst, with the formation of uretdione polyisocyanates, isocyanurate polyisocyanates or iminooxadiazinedione polyisocyanates, and/or a reaction of isocyanates with previously formed urethane groups with the formation of allophanate polyisocyanates.

It is particularly preferably a trimerization to isocyanurate polyisocyanates or iminooxadiazinedione polyisocyanates or dimerization to uretdione polyisocyanates. It is very particularly preferably a trimerization to isocyanurate polyisocyanates or iminooxadiazinedione polyisocyanates.

In a further preferred embodiment of the present invention, the polyisocyanate is selected from the group consisting of isocyanurate polyisocyanates, biuret polyisocyanates, iminooxadiazinedione polyisocyanates, urethane polyisocyanates and allophanate polyisocyanates, more preferably from the group consisting of isocyanurate polyisocyanates, biuret polyisocyanates and iminooxadiazinedione polyisocyanates. It is precisely these isocyanates that tend to be subject to the problems described in the introduction in the removal of unreacted monomeric diisocyanates by distillation, which is why they are particularly suitable for the present process.

Step (ii)

The separation of the mixture obtained in step (i) into a gaseous stream containing monomeric diisocyanate and a liquid stream depleted in monomeric diisocyanate preferably takes place in at least one evaporator, which is generally operated at a pressure within a range from 0.005 mbar to 400 mbar, preferably 0.005 to 100 mbar, particularly preferably 0.005 to 10 mbar and very particularly preferably 0.005 to 2 mbar and a temperature within a range from 90 to 205° C., preferably within a range from 100 to 185° C., the liquid stream depleted in monomeric diisocyanate being obtained as the bottom product.

In the present case, the term "depleted" relates to the corresponding content of the component in the starting fluid from which the fluid was formed. The fluid is depleted when it contains a lower content, preferably not more than 0.9 times the content, of the component concerned. The contents are in each case as mass contents based on the total mass of the respective fluid.

In the present case, the depleted stream particularly preferably contains not more than 0.5 times the content, very particularly preferably not more than 0.1 times the content, and most preferably not more than 0.02 times the content, of the monomeric diisocyanate, based on the content in the mixture obtained in step (i). In a preferred embodiment with multistage evaporation, the depleted stream obtained in the final stage preferably contains not more than 0.1 times, particularly preferably not more than 0.01 times, and very particularly preferably not more than 0.002 times, the content of the monomeric diisocyanate, based on the content in the feed stream of the first stage. Depletion to less than 0.0005 times the content, preferably less than 0.001 times the content, of the monomeric diisocyanate is not normally necessary and therefore also impractical on economic grounds.

Suitable evaporators are preferably falling-film evaporators, thin-film evaporators or short-path evaporators. In a preferred embodiment of the process of the invention, the separation is carried out as a multistage separation, preferably in 2 to 5 stages, particularly preferably in 2 to 4 stages, very particularly preferably in 3 to 4 stages, and most preferably in 3 stages. Multistage design is understood as meaning that a plurality of evaporators, each having at least one infeed and at least one bottom outfeed, are used in series, the bottom outfeed of one evaporator in each case serving as the infeed of the next evaporator. It is also possible to execute one or more of these evaporation stages in a plurality of evaporators operated in parallel, although this is associated with increased expenditure on equipment.

In the preferred embodiment with a multistage separation in step (ii) of the mixture obtained in step (i), it is advantageous to lower the pressure from one stage to the next, with at least the final stage operated at a pressure preferably between 0.005 and 10 mbar, more preferably between 0.005 and 2 mbar. In order for the separation to be performed under particularly mild conditions, the pressure is in the first stage additionally within a range from 2 to 100 mbar.

The liquid stream depleted in monomeric diisocyanate that is obtained in step (ii) is the desired low-monomer polyisocyanate, which contains less than 0.5% by weight, preferably less than 0.3% by weight, particularly preferably less than 0.2% by weight, and very particularly preferably less than 0.1% by weight, of the monomeric diisocyanate, based on the total mass of the stream. In the preferred embodiment with a multistage evaporation in step (ii), the product is obtained as the bottom stream of the final evaporation stage.

Preference is given to using a short-path evaporator in the final evaporation stage. Short-path evaporators have the characteristic feature of an internal condenser. Thus, in this preferred embodiment, the partial condensation of the gaseous, diisocyanate-containing stream (step (iii)) already takes place in the short-path evaporator. This reduces the gas volume flow into downstream apparatus and minimizes the pressure loss, which permits a particularly low vacuum and thus a particularly gentle separation.

Step (iii)

The partial condensation of the gaseous, diisocyanate-containing stream takes place in at least one condenser, preferably at a condenser temperature within a range from 16 to 135° C. The most suitable condenser temperature can be determined by those skilled in the art according to the boundary conditions present, such as the monomeric diisocyanate to be removed, the chosen pressure level, and the condenser and heat-transfer surface area thereof. The condensation particularly preferably takes place at a condenser temperature within a range from 16 to 40° C., very particularly preferably within a range from 18 to 35° C. Suitable apparatus for the condensation are heat exchangers, preferably shell-and-tube heat exchangers, particular preference being given to performing the condensation in the shell space while passing through the tubes a heat-transfer medium that transports away the released heat of condensation. When using a short-path evaporator, the partial condensation already takes place on the internal condenser of the short-path evaporator itself.

Examples of suitable heat transfer media for operation of the at least one condenser in the partial condensation of the gaseous mixture in step (iii) are water, alcohol-water mixtures, salt-water solutions, thermal oils or organic solvents such as chlorobenzene. Preference is given to using water, water-alcohol mixtures or salt-water solutions, with particular preference given to using water as the heat-transfer medium.

In an alternative embodiment of the process of the invention, the partial condensation of the gaseous, diisocyanate-containing stream in step (iii) takes place in an air condenser. In this process, ambient air is passed by a fan along the outside of a tube bundle, optionally provided with cooling fins, so as to cool it. The condensation takes place inside the tubes, at the end of which the liquid condensate and the uncondensed vapor stream initially emerge together and are then separated. In this special case, the condenser temperature is to be understood as meaning the outlet temperature of the uncondensed vapor stream.

Step (iv)

The secondary condensation of the uncondensed vapor stream from step (iii) takes place in at least one secondary condenser, preferably at a secondary condenser temperature within a range from −33 to 130° C. The most suitable secondary condenser temperature can be determined by those skilled in the art according to the boundary conditions present, such as the monomeric diisocyanate to be removed, the chosen pressure level, and the secondary condenser and heat-transfer surface area thereof. The secondary condensation particularly preferably takes place at a secondary condenser temperature within a range from −20 to 25° C., very particularly preferably within a range from −10 to 17° C. The secondary condenser temperature is chosen such that it is 1 to 168 K, preferably 5 to 50 K, and more preferably 10 to 30 K, below the condenser temperature of the condenser in step (iii).

If necessary, for example because of changes in mass flows or in the composition of the vapor flow, it is possible to vary the condenser temperature and/or the secondary condenser temperature during performance of the process of the invention, while maintaining the abovementioned differential between the condenser temperature and secondary condenser temperature.

Suitable apparatus for the secondary condensation are heat exchangers, preferably shell-and-tube heat exchangers, particular preference being given to performing the secondary condensation in the shell space while passing through the tubes a heat-transfer medium that transports away the released heat of secondary condensation.

In some cases, proportions of the secondary condensate may at low temperatures solidify on the cold surfaces of the secondary condenser. In order to prevent clogging by the solidified deposits, a melting process may be performed from time to time at a higher secondary condenser temperature.

Examples of suitable heat transfer media for operation of the at least one secondary condenser in the secondary condensation in step (iv) of the uncondensed vapor stream from step (iii) are water, alcohol-water mixtures, salt-water solutions, thermal oils or organic solvents such as chlorobenzene. Preference is given to using water, water-alcohol mixtures or salt-water solutions, with particular preference given to using salt-water solutions or water-alcohol mixtures. The heat-transfer medium must be chosen such that its solidification point is below the desired secondary condenser temperature of the secondary condenser.

Step (v)

The uncondensed offgas from the secondary condenser obtained in step (iv) is fed to the suction side of a vacuum pump. For this, the gas space of the secondary condenser is fluidly connected to the suction side of the vacuum pump.

In a further preferred embodiment of the invention, a further step (iv-a) between steps (iv) and (v) is carried out, in which the uncondensed offgas stream from the secondary condenser is cooled further in a further heat exchanger, a cold trap having a cold trap temperature that is at least 1 K, preferably at least 5 K, and more preferably at least 10 K, below the secondary condenser temperature. This cold trap is fluidly connected on one side to the offgas outlet of at least one secondary condenser and on the other side to the suction side of at least one vacuum pump. The cold trap can be operated for example with a cooling medium at a temperature within a range from −10 to −200° C. The temperature of the cooling medium is preferably within a range from −15 to −60° C. and more preferably within a range from −16 to −30° C. In any event, the temperature of the cooling medium is at least 1 K, preferably at least 5 K, and more preferably at least 10 K, below the secondary condenser temperature. Alternatively, it is also possible for cooling to take place for example via at least one Peltier element, provided the operating temperature of the cold trap, i.e. in this special case the temperature of at least part of the heat transfer surface, is within the abovementioned ranges for the temperature of the cooling medium. In the case of a multistage design of the distillation apparatus, the cold trap is preferably arranged such that at least part of the offgas from the first distillation stage passes through it, and is cooled down by it, before it reaches the suction side of the associated vacuum pump. Particularly preferably, the entire offgas stream passes through the cold trap before entering the vacuum pump situated furthest downstream.

The vacuum pump can itself be part of a multistage vacuum system. Such an arrangement is described in more detail in the exemplary embodiments.

The steps (i), (ii), (iii), (iv), (iv-a), and (v) described above can if necessary be supplemented by further process steps.

One such example here is the possibility of installing droplet separators at various points in the process of the invention, for example at the vapor outlet of the evaporator. Another example is the use of filters, for example upstream of the inlet to a vacuum pump or at the bottom discharge of the final evaporator, i.e. in the product stream.

In a further preferred embodiment of the process, the liquid condensate from step (iii) is at least partially recycled, optionally after further purification steps, to step (i) of the process, i.e. the modification of a monomeric diisocyanate. This avoids waste and allows the process to be operated particularly economically. Optionally, in addition to the liquid condensate from step (iii) or instead of the liquid condensate from step (iii), the secondary condensate can also be at least partially recycled to step (i), optionally after further purification steps. If the liquid condensate and the secondary condensate are recycled, there are different embodiments. For example, it is possible to recycle the liquid condensate from the condensation (step (iii)) and the secondary condensate from step (iv) separately or, after they have been combined to form a combined condensate, together in step (i). If the liquid condensate and/or secondary condensate undergo a further purification step, such as a filtration or distillation, this can take place either on the condensate only, on the secondary condensate only, on the condensate and secondary condensate each separately, or on the combined condensate.

A further preferred embodiment of the invention is a process for producing low-monomer polyisocyanates comprising the following steps:

(i) modifying at least one monomeric diisocyanate to obtain a mixture comprising at least one polyisocyanate and unreacted monomeric diisocyanate, (ii) separating the mixture obtained in step (i) into at least one gaseous stream containing monomeric diisocyanate and a liquid stream depleted in monomeric diisocyanate, (iii) partially condensing the gaseous stream from (ii) in at least one condenser, affording a liquid condensate and an uncondensed vapor stream, (iv) performing a secondary condensation of the uncondensed vapor stream obtained in step (iii) in at least one secondary condenser, affording a secondary condensate and an uncondensed offgas, and (v) feeding the uncondensed offgas from step (iv) to the suction side of a vacuum pump, characterized in that the at least one secondary condenser in step (iv) is operated at a secondary condenser temperature and the at least one condenser in step (iii) is operated at a condenser temperature wherein the secondary condenser temperature is ≥1 to ≤168 K lower than the condenser temperature, and that the liquid condensate from step (iii) is at least partially recycled, optionally after further purification steps, to step (i) of the process, i.e. the modification of the at least one monomeric diisocyanate.

Alternatively, a further preferred embodiment of the invention is a process for producing low-monomer polyisocyanates, comprising the following steps:

(i) modifying at least one monomeric diisocyanate to obtain a mixture comprising at least one polyisocyanate and unreacted monomeric diisocyanate, (ii) separating the mixture obtained in step (i) into at least one gaseous stream containing monomeric diisocyanate and a liquid stream depleted in monomeric diisocyanate, (iii) partially condensing the gaseous stream from (ii) in at least one condenser operated at a condenser temperature of 16 to 135° C., preferably 16 to 40° C., and more preferably 18 to 35° C., affording a liquid condensate and an uncondensed vapor stream, (iv) performing a secondary condensation of the uncondensed vapor stream obtained in step (iii) in at least one secondary condenser operated at a secondary condenser temperature of –33 to 130° C., preferably –20 to 25° C., and more preferably –10 to 17° C., affording a secondary condensate and an uncondensed offgas, and (v) feeding the uncondensed offgas from step (iv) to the suction side of a vacuum pump, characterized in that the secondary condenser temperature of the at least one secondary condenser in step (iv) is ≥1 to ≤168 K, preferably 5 to 50 K, and more preferably 10 to 30 K, lower than the condenser temperature of the at least one condenser in step (iii).

A particularly preferred embodiment of the invention is a process for producing low-monomer polyisocyanates, comprising the following steps:

(i) modifying at least one monomeric diisocyanate to obtain a mixture comprising at least one polyisocyanate and unreacted monomeric diisocyanate, (ii) separating the mixture obtained in step (i) into at least one gaseous stream containing monomeric diisocyanate and a liquid stream depleted in monomeric diisocyanate, (iii) partially condensing the gaseous stream from (ii) in at least one condenser operated at a condenser temperature of 16 to 135° C., preferably 15 to 40° C., and more preferably 18 to 35° C., affording a liquid condensate and an uncondensed vapor stream, (iv) performing a secondary condensation of the uncondensed vapor stream obtained in step (iii) in at least one secondary condenser operated at a secondary condenser temperature of –33 to 130° C., preferably –20 to 25° C., and more preferably –10 to 17° C., affording a secondary condensate and an uncondensed offgas, and (v) feeding the uncondensed offgas from step (iv) to the suction side of a vacuum pump, characterized in that the secondary condenser temperature of the at least one secondary condenser in step (iv) is ≥1 to ≤168 K, preferably 5 to 50 K, and more preferably 10 to 30 K, lower than the condenser temperature of the at least one condenser in step (iii) and that the liquid condensate from step (iii) is at least partially recycled, optionally after further purification steps, to step (i) of the process, i.e. the modification of the at least one monomeric diisocyanate.

The invention also provides for the use of the polyisocyanates produced by the process of the invention as starting materials for the production of polymers such as foamed plastics, polyurethane paints, coating agents, adhesives or additives.

The polyisocyanates produced according to the invention are particularly suitable for use in the production of one- and two-component polyurethane paints.

When used as a crosslinker component in 2-component coatings, the polyisocyanates of the invention are generally combined with OH and/or NH components, as are known per se from 2-component polyurethane systems, for example hydroxy-functional polyesters, polyacrylates, polycarbonates, polyethers, polyurethanes, and polyfunctional amines. However, they can also be used as a single component for the production of (partly) moisture-curing plastics and coatings.

The invention further provides a composite body comprising at least one polymer of the invention in direct contact with at least one substrate consisting of metal, plastic, wood or mixtures thereof.

EXAMPLES

All percentages are based on weight, unless otherwise stated.

NCO contents were determined titrimetrically in accordance with DIN EN ISO 11909:2007-05. Residual monomer contents were measured in accordance with DIN EN ISO 10283:2007-11 by gas chromatography with internal standard.

Crude Product A:

Isocyanurate polyisocyanate produced in a manner known per se by catalytic trimerization of hexamethylene diisocyanate. The residual monomer content after stopping the reaction was approx. 77% hexamethylene diisocyanate based on the total reaction mixture.

Crude Product B:

Isocyanurate polyisocyanate produced in a manner known per se by catalytic trimerization of pentamethylene diisocyanate. The residual monomer content after stopping the reaction was approx. 50% pentamethylene diisocyanate based on the total reaction mixture.

Crude Product C:

Iminooxadiazinedione polyisocyanate produced in a manner known per se by catalytic trimerization of hexamethylene diisocyanate. The residual monomer content after stopping the reaction was approx. 45% hexamethylene diisocyanate based on the total reaction mixture.

Crude Product D:

Isocyanate-terminated prepolymer produced in a manner known per se by reaction of a polyether polyol with excess tolylene diisocyanate. The residual monomer content after the reaction was approx. 38% tolylene diisocyanate based on the total reaction mixture.

Crude Product E:

Polyisocyanate containing allophanate groups and isocyanurate groups produced in a manner known per se by catalytic reaction of hexamethylene diisocyanate with a monohydric alcohol in the presence of a trimerization catalyst. The residual monomer content after stopping the reaction was approx. 40% hexamethylene diisocyanate based on the total reaction mixture.

Comparative Examples 1a-e (not According to the Invention)

The crude products A-E were each continuously distilled in a three-stage vacuum distillation apparatus to remove residual monomer from the polyisocyanate. The vacuum system too was multistage; a vacuum pump was provided for each distillation stage, the pressure-side offgas stream from the vacuum pump of the third distillation stage being fed together with the uncondensed offgas from the second distillation stage to the suction side of the vacuum pump of the second distillation stage. Similarly, the pressure-side offgas stream of the vacuum pump of the second distillation stage was fed together with the uncondensed offgas of the first distillation stage to the suction side of the vacuum pump of the first distillation stage. The pressure-side offgas stream of the vacuum pump of the first distillation stage was disposed of via the plant offgas system.

A falling-film evaporator heated with steam was used as the first distillation stage. The pressure in this first evaporation stage was 25 mbar. The vapors from the falling-film evaporator were condensed in a condenser operated with cooling water. The flow temperature of the cooling water was 27° C. Uncondensed fractions were removed from the distillation apparatus via the vacuum system.

The unevaporated bottom stream was supplied as the infeed to a second falling-film evaporator, where further monomer was evaporated from the now prepurified polyisocyanate. This second distillation stage too was designed as a falling-film evaporator, which was operated at a pressure of 7 mbar and likewise steam-heated. The vapors were again condensed in a condenser operated with cooling water. The flow temperature of the cooling water was likewise 27° C. Uncondensed fractions were removed from the distillation apparatus via the vacuum system.

The unevaporated bottom stream from this second distillation stage was in turn supplied as the infeed to the final distillation stage. This final distillation stage was designed as a short-path evaporator with internal condenser, the heating surfaces being heated with steam and the internal condenser being operated with cooling water, which in turn had a flow temperature of 27° C. The pressure in the short-path evaporator was 1.4 mbar. Uncondensed vapor fractions were removed from the distillation apparatus via the vacuum system. The bottom product was cooled and analyzed by gas chromatography.

Residual monomer contents of <0.1% could be achieved for short periods, but the vacuum pumps achieved only a very short service life of 7-18 days, which meant that operation had to be paused time and again in order to repair or replace them. Moreover, when vacuum pumps failed, this sometimes also resulted in breakthrough of bottom product having higher residual monomer contents, with the result that ultimately the desired residual monomer contents of <0.1% were not reliably conformed to.

Comparative Examples 2a-e (not According to the Invention)

The crude products A-E were distilled in the same way as in comparative examples 1a-e, with the difference that cooling brine having a flow temperature of 4° C. was now used as the operating medium for the condensers. The pressure in the distillation stages was initially 25 mbar (1st stage), 7 mbar (2nd stage) and 1.4 mbar (3rd stage).

In these cases, residual monomer contents of <0.1% could be achieved for a short period. However, in all cases there was after a few days a pressure rise in the distillation apparatus and the desired residual monomer content of <0.1% was no longer attained in the bottom outflow of the third distillation stage. The distillation was paused and subsequent inspection of the apparatus revealed a clear build-up of solids on the cooling surfaces of the condensers, which, with the exception of comparative example 2d (distillation of crude product D: prepolymer based on toluene diisocyanate), in which the pressure rise developed the most rapidly, could not be removed by simply melting it off.

Examples 1a-e

The distillation apparatus used in comparative examples 1a-e and comparative examples 2a-e was reconfigured so that the vapors from each distillation stage now each passed through a second condenser, the secondary condenser. The first condensation stage was in each case operated with cooling water at a flow temperature of 27° C. and the secondary condensation stage with cooling brine at a flow temperature of 4° C. In the case of the short-path evaporator, the internal condenser was thus operated with cooling water and the newly added external secondary condenser with cooling brine.

The distillation apparatus modified and operated in this way made possible the ongoing production of distilled bottom products having a residual monomer content of <0.1%. When the apparatus was inspected after many weeks of operation, no problematic solid deposits were found on the cooling surfaces of the condensers.

The invention claimed is:

1. A process for producing polyisocyanates, comprising the following steps:
   (i) modifying at least one monomeric diisocyanate to obtain a mixture comprising at least one polyisocyanate and unreacted monomeric diisocyanate,
   (ii) separating the mixture obtained in step (i) into at least one gaseous stream containing monomeric diisocyanate and a liquid stream depleted in monomeric diisocyanate,
   (iii) partially condensing the gaseous stream from (ii) in at least one condenser, affording a liquid condensate and an uncondensed vapor stream, wherein the partially condensing in step (iii) takes place at a condenser temperature within a range from 16 to 135° C.,
   (iv) performing a secondary condensation of the uncondensed vapor stream obtained in step (iii) in at least one secondary condenser, affording a secondary condensate and an uncondensed offgas, wherein the secondary condensation in step (iv) takes place at a secondary condenser temperature within a range from −33 to 130° C., and
   (v) feeding the uncondensed offgas from step (iv) to the suction side of a vacuum pump, wherein the at least one secondary condenser in step (iv) is operated at a secondary condenser temperature and the at least one condenser in step (iii) is operated at a condenser temperature wherein the secondary condenser temperature is 5 to 50 K lower than the condenser temperature.

2. The process as claimed in claim 1, wherein the monomeric diisocyanate is selected from the group consisting of 1,5-diisocyanatopentane (PDI), 1,6-diisocyanatohexane (HDI), 1-isocyanato-3,3,5-trimethyl-5-isocyanatomethylcyclohexane (isophorone diisocyanate, IPDI), 4,4'-diisocyanatodicyclohexylmethane, 2,4'-diisocyanatodicyclohexylmethane, bis(isocyanatomethyl)norbornane, 1,3- and 1,4-bis(isocyanatomethyl)benzene (XDI), tolylene diisocyanate (TDI), 2,4'- and 4,4'-diisocyanatodiphenylmethane (MDI), any mixtures thereof.

3. The process as claimed in claim 1, wherein the modifying in step (i) is an intermolecular reaction between isocyanate groups, optionally in the presence of a basic catalyst, with the formation of one or more of uretdione polyisocyanates, isocyanurate polyisocyanates and iminooxadiazinedione polyisocyanates, and/or a reaction of isocyanates with previously formed urethane groups with the formation of allophanate polyisocyanates.

4. The process as claimed in claim 1, wherein the liquid stream depleted in monomeric diisocyanate obtained in step (ii) contains not more than 0.5 times the content, of the monomeric diisocyanate, based on the content in the mixture obtained in step (i).

5. The process as claimed in claim 1, wherein the liquid condensate from step (iii) is at least partially recycled, optionally after further purification steps, to step (i) of the process.

6. The process as claimed in claim 1, wherein the separating in step (ii) is performed by at least one evaporator selected from the group consisting of a falling-film evaporator, a thin-film evaporator and a short-path evaporator.

7. The process as claimed in claim 1, wherein the separating in step (ii) is carried out as a multistage separation in 2 to 5 stages.

8. The process as claimed in claim 6, wherein a short-path evaporator is the final evaporator.

9. The process as claimed in claim 1, wherein a step (iv-a) is carried out between step (iv) and step (v), in which the uncondensed offgas stream from the secondary condenser is cooled further in a cold trap having a cold trap temperature that is at least 1 K, below the secondary condenser temperature.

\*  \*  \*  \*  \*